United States Patent [19]

Hall et al.

[11] 4,188,232

[45] Feb. 12, 1980

[54] MINI-AGGREGATE IRON ORE IN CEMENT MATRIX

[76] Inventors: William C. Hall, Albany Turnpike, Central Valley, N.Y. 10917; John M. Peterson, Toleman Rd., Rock Tavern, N.Y. 12575

[21] Appl. No.: 809,783

[22] Filed: Jun. 24, 1977

Related U.S. Application Data

[63] Continuation-in-part of Ser. No. 506,274, Sep. 16, 1974.

[51] Int. Cl.$^2$ .................................................. C04B 7/02
[52] U.S. Cl. ........................................................ 106/97
[58] Field of Search ............................ 106/97; 252/478

[56] References Cited

U.S. PATENT DOCUMENTS

| | | | |
|---|---|---|---|
| 2,279,262 | 4/1942 | Edwards | 106/97 |
| 2,526,674 | 10/1950 | Larsen | 106/97 |
| 2,726,339 | 12/1955 | Borst | 106/97 |
| 2,961,399 | 11/1960 | Alberti | 106/97 |
| 3,357,851 | 12/1967 | Montgomery | 106/97 |
| 3,434,978 | 3/1969 | Vogel | 106/97 |
| 3,645,916 | 2/1972 | Hall et al. | 252/478 |

*Primary Examiner*—James Poer
*Attorney, Agent, or Firm*—Posnack, Roberts, Cohen & Spiecens

[57] ABSTRACT

The use of a mini-aggregate iron ore concentrate uniformly dispersed in an inorganic cement matrix produces a structural product superior in many respects to ordinary concrete. Structural improvement is achieved, especially with respect to higher compressive and tensile strengths, and a significant increase in bond strength to steel reinforcement members is attained. Substantially the same strength can be obtained at all slumps.

7 Claims, No Drawings

MINI-AGGREGATE IRON ORE IN CEMENT MATRIX

Other Applications—This application is a continuation-in-part of our earlier filed application Ser. No. 506,274 filed Sept. 16, 1974.

FIELD OF INVENTION

This invention relates to the use of metallic mortars to obtain desired structural characteristics.

BACKGROUND

Concrete has been used extensively in a wide variety of applications for many years. It is particularly employed as a basic raw material by the civil engineer. Its relatively low cost and high compressive strength, and the ease of pouring of the freshly prepared, water-mixture into forms of desired shapes are advantages which adapt it for such uses as buildings, industrial silos, highways, bridges and dams. More recently, its use in nuclear power plants has become common practice.

Special types of concrete have been developed with particularly desirable properties to meet the requirements of special situations. Low density concrete may be cited as an example of a modified formulation designed to provide the characteristics of light weight and low thermal conductivity which are desired in building construction. Other examples include special formulations involving use of certain additives to improve water tightness, and other additives to increase air entrainment to improve workability of freshly prepared wet mixtures before pouring or pumping.

Earlier, it was noted that a product made from an iron ore concentrate possessed special characteristics, which were particularly useful for the attenuation of nuclear radiation. Disclosure of this fact was made in U.S. Pat. No. 3,645,916 issued Feb. 29, 1972.

Concrete formulations have used many different types of aggregates, usually with a wide range of sizes, often including mesh sizes of two or three inches or more. Use of natural rock or ore of large size often leads to a structure which is non-uniform in composition, because the aggregate size distribution of the rock or ore as it comes from the gravel pit or mine may not be easily reproducible from one delivery to the next. Large size aggregates in the concrete mix tend to bridge during pouring to form air pockets, especially around reinforcement bars and in corners of forms. Large aggregates also often are caught and held in baffles in mixing equipment, which may cause breakage of this equipment, with the resultant delays of operations. It also is very difficult to pump mixtures containing large aggregates, and thus this efficient method of construction is often excluded in these situations.

Aggregates in concrete produce differences in composition within the body of the set material. Often there is a significant differential in certain physical properties of the different compositions, such as thermal conductivity and thermal expansion. With temperature and other changes, these differentials create unequal stresses, leading to crack-generating stress peaks because of deformation incompatability.

*Properties of Concrete* (A. M. Neville, Pp. 226), referring to concrete, states: "The theoretical strength has been estimated to be as high as $1.5 \times 10^6 lb/inch^2$. This discrepancy can be explained by the presence of flaws postulated by Griffith. These flaws lead to high stress concentrations in the material under load so that a very high stress is reached in very small volumes of the specimen with a consequent microscopic fracture, while the average (nominal) stress in the whole specimen is comparatively low. The flaws vary in size and it is only the few largest ones that cause failure; the strength of a specimen is thus a problem of statistical probability."

The mean free path for a fracture in the matrix of a mortar is less than in the matrix of a concrete. Also the length of a separation between the matrix and the miniaggregate in a mortar is much less than the possible length of a separation between the matrix and the ever-so-much larger aggregate of ordinary concrete. Furthermore, average aggregates of concretes, including natural ores used for densified concretes, are large in size and differ in composition within individual pieces. In concretes, conventional or densified, probability of cracking at grain boundaries between the two phases is much greater than in the material with more homogeneous miniaggregate. This is attributed to the fact that a mini-aggregate has few, if any, grain boundaries within itself.

Concrete is much stronger in compression than in tension, and this characteristic has led to the use of a technique known as "prestressing". In this process, the material is placed initially during fabrication under considerable stress in a manner that will oppose any load applied to the structure afterwards. Presently, there is considerable interest in using the prestressed method in the nuclear industry in connection with the construction of prestressed concrete reactor vessels, commonly called PCRV, as an alternate to the steel reactor pressure vessel.

SUMMARY OF THE INVENTION

An object of the invention is to provide improved use of selected mini-aggregates, comprising an iron ore concentrate, dispersed uniformly in a cement matrix to produce a product which exhibits substantially uniform strength over a wide range of slumps.

Among major improvements realized by the use of this mini-aggregate, compared with ordinary concrete, are: higher compressive and tensile strengths, higher thermal conductivity, higher density, greater homogenity resulting in less probability of cracking under thermal stress, higher bond strength to reinforcement steel, and a thermal expansion more nearly equal to that of steel. This unique combination of properties, some of which could not be predicted, make this material particularly useful in a wide variety of industrial applications.

The superiorities of iron oxide mortar include:
(1) It endures heat better.
(2) It endures cold better.
(3) It endures thermal cycling better.
(4) It has both a co-efficient of expansion compatible to that of steel and a better bond to steel.
(5) It has both a low water/matrix ratio and a low water absorption.
(6) It has assured high strengths at all consistencies and slumps.
(7) It is pumpable, shotcreteable, pourable, plasterable and moldable.

Some major market areas include:
(1) The energy industry where thermal problems will be better controlled by the iron oxide mortar.

(2) Sewerage processing where both thermal problems and corrosive chemicals will be better controlled by the iron oxide mortar.

(3) Bridge decking, highway resurfacing, airport landing strips and airport runways where the hardness of the iron oxide mortar and the low water absorption should greatly extend the useful life of these constructions.

(4) Ocean bed seated oil platforms, underwater storage facilities and concrete coatings for underwater steel pipes, this because of low water absorption, high density and high strength.

DETAILED DESCRIPTION

Iron oxide mortar as described below has been found uniquely to have about the same structural strengths at all slumps or consistencies. All other concretes, mortars and grouts become progressively weaker as the slump is increased by the addition of more water. It is universally known that for strong concrete the water must be minimal and that addition of water for increased workability reduces the strength of the concrete with all else the same. Contrary to what is universally known this iron oxide mortar is not structurally weakened by the addition of more water to increase its slump and workability.

The foregoing is demonstrated by the following tables:

I. Sixth Edition Marks Mechanical Engineers Handbook, McGraw Hill Book Comapny, pg. 6-227, "Table II, Compressive Strength of Plain Concrete at 28 days"

TABLE II

| COMPRESSIVE STRENGTH OF PLAIN CONCRETE AT 28 DAYS | | | | | | |
|---|---|---|---|---|---|---|
| Max water content, gal per bag of cement | 5 | 5.5 | 6 | 6.5 | 7.5 | 8 |
| Compressive strength, lb. per sq. in. | 4000 | 3500 | 3000 | 2500 | 2000 | 1500 |
| Modulus of rupture, lb. per sq. in. | | | | | | |

| MIX DESIGN PROPORTIONS FOR BATCHES (ASTM C-192) | | | | |
|---|---|---|---|---|
| Batch Designation MATERIAL | 3" slump | 5" slump | 7" slump | 9" slump |
| Chemtree 1-20-26 matrix,lb. | 1025 | 1025 | 1025 | 1025 |
| Iron Ore Concentrate,lb. | 4100 | 4100 | 4100 | 4100 |
| Water, lb.* | 410 | 423 | 438 | 454 |
| Slump, in | 3 | 5 | 7 | 9 |
| Unit Weight lb/ft$^3$ | 211.3 | 211.0 | 211.1 | 210.6 |
| Air content % | 3 | 3 | 3 | 3 |
| Plastic temperature,°F.** | 81 | 81 | 80 | 80 |
| Water/matrix ratio | 0.400 | 0.413 | 0.427 | 0.443 |

*To produce desired slump.
**Freshly mixed iron mortar temperature just prior to molding specimens.

| COMPRESSIVE STRENGTH of 6" × 12" CYLINDERS (ASTMc-39)-See also Table 3 below. | | | | |
|---|---|---|---|---|
| Batch Designation | 3" slump | 5" slump | 7" slump | 9" slump |
| 3 day cure, psi | 3270 | 3520 | 3520 | 3010 |
| 7 day cure, psi | 4030 | 4370 | 4360 | 3680 |
| 14 day cure, psi | 4555 | 4860 | 5080 | 4580 |
| 28 day cure, psi | 4955 | 5130 | 5220 | 4760 |
| 90 day cure, psi | 6815 | 6812 | 6392 | 6462 |
| 120 day cure, psi | 7227 | 7367 | 7360 | 7022 |

Consistently the highest compressive strengths are with slumps of 5" & 7". Slumps of 3" and 9" have significantly lower strength at 3 days but the difference diminishes with time. At all slumps the strengths equal those of low slump, hard to work concretes.

STRENGTH PROPERTIES

The high compressive strength of iron oxide mortar at all slumps and consistencies from ultra stiff to self-leveling (at 120 day cure, 6"×12" cylindrical sample of iron oxide mortar with 9" slump yields a compressive strength of 7072 psi and 7227 psi for a 3" slump similar sample) assures concrete design strength everywhere. Such assured high strengths are very difficult to achieve with other bulk concretes under ordinary conditions because:

(1) Stiff concrete bridges reinforcement bars leaving voids, and (2) flowable concrete lacks strength.

The iron oxide mortar is unique in:

(1) Having same approximate structural strengths at all consistencies or slumps.

(2) Having a dependable compatible coefficient of expansion to steel.

The uniqueness of the iron oxide mortar at a high slump is that the following unique problems exist for its application:

(1) Bleeding that results from the relatively rapid self consolidation.

(2) Apparent shrinkage, but not real that results from the relatively rapid self consolidation.

A consequence of the above problems is that special instructions for emplacement of high slump iron oxide mortar have had to be developed, as other concretes, mortars and grouts:

(1) are not commonly used at high slumps because of the poor strength and the many voids of the cured product.

(2) Do not have bleeding on the scale of the iron oxide mortar, in spite of its low water/matrix ratio even at high slump.

For instance, in spite of the rapid self consolidation it is desirable and, for a large emplacement, necessary to vibrate or rod well the emplaced iron oxide mortar and speed up the bleeding. It is then necessary that the bleeding overflow the forms or be vented and that additional iron oxide mortar be emplaced to fill the area left unoccupied by the consolidation and removal of the bleeding that otherwise would have occupied space at the top of the consolidated iron oxide mortar. The foregoing problems and the answers to them are not necessary when the iron oxide mortar is installed at stiff low slumps and as the product was described in U.S. Pat. No. 3,645,916.

The unique quality assurance of installing the iron oxide mortar at a flowable consistency or high slump and the measures to avoid problems from the bleeding are covered by the following:

(1) Bleeding is effected in that CHEMTREE 1-20-26 matrix (or other such matrix) with iron ore will flow over the sides of an open box or cylinder based on the emplacement of additional CHEMTREE 1-20-26 and it is rodded or vibrated in such a situation. The last material emplaced has relatively low water content (low slump) and it will act as a blotter and absorb excess moisture from the already emplaced CHEMTREE 1-20-26 below which had a high slump and excess water.

(2) CHEMTREE 1-20-26 matrix (or other such matrix) with iron ore is easily vented from an enclosed emplacement. Indeed, the unique workability of the mortar without sacrifice of strength, makes possible the near virtual elimination of voids commonly found below the roof of an enclosed emplacement with other types of concrete. This is done by having very small holes just under the roof. Removal of the excess water which has bled to the top surface of the iron oxide mortar will, for example, be effected as follows:

a. Emplacement of iron oxide mortar through a hole in the center of the roof will, when the height of the emplaced material reaches the bottom of the roof, initially be only directly under or near the hole in the center of the roof through which the emplacement has been made. At this stage, air and water will be under the roof on all sides of the iron oxide mortar which is under and near the emplacement hole in the center of the roof. The emplacement of additional iron oxide mortar through the emplacement hole will apply pressure to the air and water, and vent them through small holes just under the roof. Pressure adequate to do this will only come from having a head (additional iron oxide mortar) to a reasonable distance above the top of the roof. To the roof is connected a horizontal steel plate which is to have CHEMTREE 1-20-26 emplaced above it. The needed head may be created by emplacing iron oxide mortar over the roof to an adequate depth. Alternatively, if the roof with the emplacement of iron oxide mortar is to be emplaced above it, then a pipe, sleeve or hollow cylinder with an inside diameter slightly larger than the diameter of the emplacement hole, may be centered over the emplacement hole, and filled to a height to create adequate pressure on the iron oxide mortar directly under the emplacement hole. The excess water and air will be forced out the vent holes as the iron oxide mortar fills in between the bottom of the roof and the top of the previously emplaced iron oxide mortar to leave virtually no space inside the containment, including immediately under the roof other than iron oxide mortar.

Iron oxide mortar used as a grout to fill voids between previously emplaced larger aggregates should involve the previously described techniques relative to the removal of excess water by either overflow or venting.

Apparent shrinkage will occur as excess water which is expressed as bleeding to the surface is not removed and replaced with additional solid iron oxide mortar. Standard concrete technology is fully satisfactory for the proper emplacement of low slump (stiff) iron oxide mortar. Standard concrete technology has never envisaged the emplacement of high slump or self leveling concrete mortar. As a consequence, standard concrete technology has not been established for working with such a consistency. The technology described above is appropriate for working with the high slump or self leveling iron mortar.

The real shrinkage of iron oxide mortar should not be confused with the apparent shrinkage which is not real shrinkage at all, but only a relocation of the excess water and its evaporation which creates a visual appearance of shrinkage that has not actually occurred even though the eventual dimension of the casting is reduced from its dimension immediately following emplacement.

Iron oxide mortar has a real shrinkage very similar to that of standard concrete. This moderate shrinkage may be moderately reduced by substituting high quality fly ash for 20 percent of the matrix with all else the same.

Table 9 below shows that thermal conductivity for the mini-aggregate iron mortar of the invention in about 2.0 Btu/(hr) (ft$^2$)(°F./ft) as compared with about 1.0 Btu/(hr)(ft$^2$)(°F./ft) for conventional concretes. The same table also shows a thermal coefficient for the mini-aggregate iron mortar of $6.2 \times 10^{-6}$ (in)/(in)(°F.) compared to $6.5 \times 10^{-6}$ (in)/(in)(°F.) for steel and $4-7 \times 10^{-6}$ (in)/(in)(°F.) for various ordinary concretes. This greater compatibility with steel in this thermal property and twice as much thermal conductivity as compared with ordinary concretes is useful in applications involving reinforced steel or prestressed techniques, where temperature changes cause expansion and contraction of materials.

The use of the iron ore concentrate as an aggregate instead of the usual type of aggregate of ordinary concrete imparts some unexpected properties to the material. For example, the compressive and tensile strengths vary significantly less with a variation in slump. It was also noted during tests that the stress-strain curves were not smooth as found in the case of ordinary concrete, but exhibited a multiple wave motion near the point of failure that is more characteristic of a plastic material than is of a concrete material.

The compressive and tensile strengths of the iron mortar are significantly higher than those found in ordinary concrete. For example, regular concrete often is shown to have a compressive strength in the range from 2000–5000 psi, whereas, the values for the iron oxide mortar shown in Table 3 below are in the 3000–8500 psi range. An improvement is noted also for tensile strength.

The unique combination of many properties of the miniaggregate iron oxide mortar permits it to be adapted readily to all of the usual applications associated with ordinary concrete, with inherent improved characteristic for many uses. Of all the different kinds of construction, those of steel reinforcement and prestressing may be of the greatest value because of the added safety factor imparted. Interesting adaptations include situations requiring special strengths, such as various foundations, buildings, highways, airport runways, bridges, bridgedecks, dams, shipdocks, and industrial silos. Qualitative tests show that surface of the iron oxide mortar withstand wear and abrasive action well, and that the surface provides desired friction, providing better traction for vehicles and aircraft on road beds.

In may of the uses, it is interesting to note that the iron oxide mortar appears to provide a safety factor to ordinary concrete against earthquake stresses equal to about seven tenths of a Richter Scale unit. As the Richter Scale is a logarithmic scale that increases by a multiple of ten for a change of one on the scale, it appears that this material when compared with regular concrete will withstand earthquake forces which are five times more intense.

The freshly prepared mini-aggregate iron ore concentrate mortar may be applied by various standard techniques such as, for example, pouring, casting, molding, pumping, spraying, and plastering. Regulation of the degree of vibration or rodding, and the control of the water content of the mixture, can be made to minimize separation of the heavy aggregate from the cement phase.

An attractive, polished, decorative surface effect can be imparted to the iron mortar by using very smooth forms, such as plastic sheet, in casting a moderately high slump wet iron mortar, preferably with a moderate amount of vibration. The surface has a sheen appearance with little or no polishing, and particles of the iron ore concentrate produce a glistening effect. The surface appearance is enhanced when White Portland cement is substituted for ordinary cement, and various standard cement dyes and coloring materials may be used to produce a variety of decorative effects. Such surfaces may be applied in the form of a plaster to an existing wall. These surfaces may be sealed or covered with a clear coating for their protection.

Tests indicate that a wide range in ratio of the mini-aggregate to cement in the mixture may be used in the practice of this invention, depending upon the requirement of the particular application. The upper practical limit is approximately an 85-15 ratio of mini-aggregate to cement. The preferred limits lie between about 80-20 and about 50-50 ratios of mini-aggregate to cement.

Various ranges of particle size distributions also may be used provided the largest particle is less than about 8 mesh. Substantial quantity of particle size smaller than about 150 mesh should be avoided. A range of aggregate particle sizes in a given mixture within these specified limits is preferred to a single uniform mesh size, for improved structural strength and high density.

The mini-aggregate iron mortar cures much more rapidly and to a somewhat higher ultimate strength, when subjected to a carbon dioxide atmosphere. The acceleration in cure is most marked when the $CO_2$ atmosphere is applied immediately after preparation of the iron mortar, and the effect increases as the partial pressure of the $CO_2$ is increased.

Other inorganic cementitious materials such as, for example, the oxide or hydroxide of calcium or magnesium, magnesium oxychloride, and various mixtures thereof may be substituted for Portland cement to give improved corresponding structures. Organic cementitious materials such as polimers and epoxirs may be substituted for the inorganic matrixs.

The particular iron ore concentrate preferred in the practice of the invention is obtained by purifying certain hematite ores to a concentrate having a high ferric oxide content, in the order of about 85 to 95 percent by weight. The preferred concentrate is obtained by the purification of gray hematite, or specularite.

Gray hematite, characterized by its disk-like crystals with bright metallic luster, is purified, for example, by crushing and processing in a Humphrey's Spiral. This equipment, by gravity separation, concentrates the ferric oxide content of the natural ore by removing large proportions of impurities present therein and yields a product of substantially controlled reproducible particle size eminently suitable for use in the present invention.

For example, a natural gray hematite ore processed as indicated above gave a product containing about 90 weight percent of ferric oxide, with a bulk density of from about 160 to about 190 pounds per cubic foot. The ore concentrate, nearly black in color, glistened brightly, showed sharp crystalline corners, flat cleavage planes, and was substantially free of dust. The particles had the further advantage of being hard and not being easily broken on handling.

A typical screen analysis of the mini-aggregate is shown in Table 1.

TABLE 1 (a)

| Physical Properties of the Iron Ore Concentrate Mini-Aggregate (ASTM-C33) ||
| Sieve Analysis ||
| Sieve size | % Passing |
| --- | --- |
| No. 4 | 100 |
| No. 8 | 99.8 |
| No. 16 | 89.0 |
| No. 30 | 55.2 |
| No. 50 | 21.7 |
| No. 100 | 4.7 |
| Fineness Modulus | 2.30 |
| Unit Weight (lb/ft$^3$) | |
| Loose | 162 |
| Dry rodded | 192 |
| Absorption (moisture) | 0.11% |
| Specific gravity | 4.68 |

TABLE 1 (b)

| ANALYSIS OF IRON ORE CONCENTRATE MINI-AGGREGATE |||
| Sieve Analysis |||
| Sieve Size | % Passing | |
| --- | --- | --- |
| #35 | 70 | |
| #65 | 35 | Fineness Modulus 1.63 |
| #100 | 20 | Unit Weight lb/ft$^3$ |
| | | Loose 148 |
| #150 | 10 | Dry Rodded 189 |
| #200 | 5 | Absorption 0.11 |
| | | Specified Gravity 4.68 |

This invention has wide variations in the mini-aggregate-matrix-water ratio that can be used. To illustrate the effect of different water ratios on a fixed matrix-aggregate ratio, various physical properties were determined for test specimens cast from a mixture containing 4 parts of the iron ore concentrate mini-aggregate and 1 part Portland cement, by weight, with sufficient water additions to give 3", 5", 7" and 9" slumps, respectively. Results to show the relations between slump and water content, compressive strength, tensile strength, linear shrinkage, time of set, flexural strength and bond to steel are included in Tables 2,3,4,5,6,7 and 8, respectively. Additional physical properties are tabulated in Table 9. Data tabulated are averages of five samples cast from the same batch and cured under similar conditions.

TABLE 2

| Variation of Slump with Water Content[a] (ASTM C-192) |||||
| --- | --- | --- | --- | --- |
| Batch designation | 1 | 2 | 3 | 4 |
| Slump (inch) | 3 | 5 | 7 | 9 |
| Water/matrix ratio (by wt.) | 0.400 | 0.413 | 0.427 | 0.443 |
| Density rodded, 28 day cure (lb/ft$^3$) | 219 | 220 | 218 | 216 |

[a]Temperature of wet mixtures just prior to casting test specimens was 80°F. Air content of all mixtures was less than 1%.

TABLE 3

| COMPRESSIVE STRENGTH OF 6" × 12" CYLINDERS (ASTM C-39) |||||
| --- | --- | --- | --- | --- |
| Slump (inch) | 3 | 5 | 7 | 9 |
| 3 day cure (psi) | 3270 | 3520 | 3520 | 3010 |
| 7 day cure (psi) | 4030 | 4370 | 4360 | 3680 |
| 14 day cure (psi) | 4555 | 4860 | 5080 | 4580 |
| 28 day cure (psi) | 4955 | 5130 | 5220 | 4760 |

TABLE 3-continued
COMPRESSIVE STRENGTH OF 6" × 12" CYLINDERS (ASTM C-39)

| Slump (inch)       | 3    | 5    | 7    | 9    |
|--------------------|------|------|------|------|
| 40 day cure (psi)  | 5785 | 5922 | 5835 | 5730 |
| 60 day cure (psi)  | 6340 | 6480 | 6475 | 6400 |
| 90 day cure (psi)  | 6815 | 6812 | 6392 | 6462 |
| 120 day cure (psi) | 7277 | 7367 | 7360 | 7072 |

TABLE 4
TENSILE STRENGTH OF BRICKETTES (ASTM C-190)

| Slump (inch)      | 3   | 5   | 7   | 9   |
|-------------------|-----|-----|-----|-----|
| 3 day cure (psi)  | 215 | 220 | 200 | 170 |
| 7 day cure (psi)  | 290 | 300 | 305 | 280 |
| 28 day cure (psi) | 350 | 380 | 370 | 350 |
| 90 day cure (psi) | 435 | 457 | 460 | 407 |

TABLE 5
LENGTH CHANGE (ASTM C-157)

| Slump (inch)   | Length change (Shrinkage %) | | | |
|----------------|-------|-------|-------|-------|
|                | 3     | 5     | 7     | 9     |
| 1 week cure    | 0.026 | 0.028 | 0.034 | 0.034 |
| 2 week cure    | 0.034 | 0.040 | 0.043 | 0.043 |
| 4 week cure    | 0.043 | 0.040 | 0.046 | 0.043 |
| 8 week cure    | 0.060 | 0.069 | 0.072 | 0.074 |
| 16 week cure   | 0.069 | 0.074 | 0.077 | 0.077 |

TABLE 6
TIME OF SET (ASTM C-403)

| Slump (inch) | 3            | 5            | 7            | 9            |
|--------------|--------------|--------------|--------------|--------------|
| Initial set  | 3hr. 22 min. | 3hr. 25min.  | 3hr. 30min.  | 3hr. 27min.  |
| Final set    | 5hr. 22 min. | 5hr. 24min.  | 5hr. 31min.  | 5hr. 22min.  |

TABLE 7
BOND TO STEEL (ASTM C-234)[a]

| Slump (inch)            | 3   | 5   | 7    | 9   |
|-------------------------|-----|-----|------|-----|
| Vertical bar (psi)      | 905 | 940 | 910  | 870 |
| Top Horizontal bar (psi)| 890 | 890 | 900  | 800 |
| Bottom horizontal bar (psi) | 930 | 960 | 1010 | 930 |

[a]No. 6 deformed bars, grade 60. 28 day cure, ultimate stress (barpullout)

TABLE 8
FLEXURAL STRENGTH (ASTM C-78)
(3" × 3" × 12" prism specimens)
Flexural strength (psi)

| Slump (inch) | 3   | 5   | 7   | 9   |
|--------------|-----|-----|-----|-----|
| 3 days       | 420 | 430 | 430 | 370 |
| 7 days       | 550 | 520 | 480 | 450 |
| 28 days      | 720 | 700 | 630 | 620 |

TABLE 9
PROPERTIES OF SET METTALIC MORTAR

| Property | Test Method | |
|---|---|---|
| Thermal properties | | |
| Thermal conductivity (Btu/(hr)(ft²)) $\left(\frac{°F.}{ft}\right)$ | CE 44-63 | 2.0 |
| Thermal diffusivity(ft²/hr) | E 36-63 | 0.0033 |
| Thermal coefficient((in)/((in)(°F.)) | CE 44-63 | $6.2 \times 10^{-6}$ |
| Specific heat ((Btu)/(lb.)(°F.)) | | 0.30 |
| Heat of hydration (cal/g) | ASTM C 186 | |
| 7 day cure | | 72.2 |
| 28 day cure | | 79.7 |
| Structural properties | | |

TABLE 9-continued
PROPERTIES OF SET METTALIC MORTAR

| Property | Test Method | |
|---|---|---|
| Poisson's ratio | ASTM C 469 | 0.27 |
| Static modulus (psi) | | $4.47 \times 10^6$ |
| Dynamic modulus, transverse (psi) | ASTM C 215 | $6.9 \times 10^6$ |
| Miscellaneous | | |
| Electrical conductivity (saturated) (mho/in) | | $1.92 \times 10^{-3}$ |

Another series of tests was made to show similar effects for mixtures containing 7 parts of iron ore concentrate mini-aggregate and 3 parts Portland cement, by weight. These results are tabulated in Tables 10-16, inclusive.

TABLE 10
VARIATION OF SLUMP WITH WATER CONTENT[a] (ASTM C-192)

| Batch designation          | 1     | 2     | 3     | 4     |
|----------------------------|-------|-------|-------|-------|
| Slump (inch)               | 3     | 5     | 7     | 9     |
| Water/matrix ratio (wt %)  | 0.304 | 0.314 | 0.327 | 0.339 |
| Density rodded, 28 day cure (lb/ft³) | 205 | 206 | 205 | 203 |

[a]Temperature of wet mixtures just prior to molding test specimens was 80° F. Air content of all mixtures was less than 1%.

TABLE 11
COMPRESSIVE STRENGTH OF 6" × 12" CYLINDERS (ASTM C-39)[a]

| Slump (inch)       | 3    | 5    | 7    | 9    |
|--------------------|------|------|------|------|
| 3 day cure (psi)   | 6183 | 6585 | 6277 | 6185 |
| 7 day cure (psi)   | 6295 | 6760 | 6550 | 6397 |
| 14 day cure (psi)  | 6662 | 6812 | 6600 | 6535 |
| 28 day cure (psi)  | 7047 | 7457 | 7220 | 6993 |
| 40 day cure (psi)  | 7642 | 7925 | 7530 | 7400 |
| 60 day cure (psi)  | 7720 | 8617 | 8425 | 8313 |
| 90 day cure (psi)  | 8435 | 9000 | 8520 | 8372 |
| 120 day cure (psi) | 8642 | 9127 | 8797 | 8560 |

[a]Averages of 5 specimens

TABLE 12
TENSILE STRENGTH OF BRICKETTES (ASTM C-190)

| Slump (inch)      | 3   | 5   | 7   | 9   |
|-------------------|-----|-----|-----|-----|
| 3 day cure (psi)  | 310 | 355 | 355 | 300 |
| 7 day cure (psi)  | 450 | 460 | 440 | 390 |
| 28 day cure (psi) | 485 | 520 | 520 | 450 |
| 90 day cure (psi) | 607 | 663 | 665 | 570 |

TABLE 13
LENGTH CHANGE (ASTM C-157)

| Slump (inch)  | 3     | 5     | 7     | 9     |
|---------------|-------|-------|-------|-------|
| Length change (Shrinkage)% | | | | |
| 1 week cure   | 0.034 | 0.043 | 0.037 | 0.034 |
| 2 week cure   | 0.057 | 0.054 | 0.048 | 0.051 |
| 4 week cure   | 0.057 | 0.057 | 0.060 | 0.060 |
| 8 week cure   | 0.069 | 0.077 | 0.072 | 0.072 |
| 16 week cure  | 0.086 | 0.089 | 0.092 | 0.083 |

TABLE 14
TIME OF SET (ASTM C-403)

| Slump (inch) | 3          | 5          | 7          | 9          |
|--------------|------------|------------|------------|------------|
| Initial set  | 1 hr 30 min | 1 hr 30 min | 1 hr 45 min | 1 hr 50 min |
| Final set    | 3 hr 5 min  | 3 hr 30 min | 3 hr 30 min | 3 hr 30 min |

TABLE 15

| BOND TO STEEL (ASTM C-234)[a] | | | | |
|---|---|---|---|---|
| Slump (inch) | 3 | 5 | 7 | 9 |
| Vertical bar (psi) | 1050 | 1060 | 980 | 930 |
| Top horizontal bar (psi) | 1130 | 960 | 1050 | 940 |
| Bottom horizontal bar (psi) | 1100 | 990 | 1050 | 980 |

[a]For No. 6 deformed bars, grade 60.28 day cure, ultimate stress (bar pullout)

TABLE 16

| FLEXURAL STRENGTH (ASTM C-78) (3" × 3" × 12" prism specimens) | | | | |
|---|---|---|---|---|
| Slump (inch) | 3 | 5 | 7 | 9 |
| Flexural strength (psi) | | | | |
| 3 days | 550 | 570 | 520 | 490 |
| 7 days | 820 | 740 | 670 | 640 |
| 28 days | 1030 | 940 | 840 | 750 |

Boiling Water Reactors (BWR$_s$) have unique construction difficulties with their primary shields. The internal structural members and the sleeves for penetrations collectively occupy a large proportion of the shield space. The iron oxide mortar with both rheology and shileding properties favorable for the application provides improved quality assurance. Substantial cost savings are achieved by minimizing need for inspection holes in the steel liner plates and the later high cost of welding them shut.

The purpose of the primary shield is to substantially reduce the nuclear radiation flux. In a BWR, the large number of penetrations through the shield makes the shield a plumber's nightmare. As a BWR primary shield is only about two feet thick, its structural strength is all from its steel. The concrete is only for shielding. But the volume of the structural steel, the high proportion of it that is horizontal, and the fact that the penetration sleeves are horizontal cause great difficulty for emplacement of the concrete. This has sometimes been done by prepacking which involves hand placement of aggregates and grouting between them, an expensive but effective procedure. Another way has been to fill from the top by pumping and vibrating. This method is substantially lower in cost than prepacking, but quality assurance has been a problem. The inspection holes needed for both inspection of the trouble spots and filling of voids has often negated the cost savings of this method over prepacking.

Iron oxide mortar with its unique rheological properties provides the quality assurance to avoid the high costs of prepacking and of numerous inspection holes in the steel liner plates.

The iron oxide mortar uniquely has approximately the same final structural strength when emplaced at a self-leveling consistency as when stiff. As a consequence, the problem of voids in corners and under the internal structural steel members or under the sleeves for penetrations is controlled. The iron oxide mortar is a very much improved product for the application and when emplaced by good standard concrete installation procedures, it leaves no substantial voids.

The iron oxide mortar has many other advantages for the application. These include:

(1) Attenuation of both neutrons and gamma rays is good because of its homogeneity, density and elemental composition.

(2) Thermal properties, which include: (a) High thermal conductivity which typically reduces a temperature differential in the material to about 40% that of standard concrete, with the other factors the same (b) Nearly identical co-efficient of expansion to that of steel which avoids development of a slip joint relationship with the steel reinforcement bars after a number of thermal cycles (3) Better bond to steel (4) Improved modulus of elasticity.

In summary, the iron oxide mortar appears to be a very good material for BWR primary shields and a material that is much improved for the purpose over any known alternative. All aspects of nuclear power reactor costs have been rising. Here is one application where it appears that significant cost savings may be achieved. An added advantage for the use of iron oxide mortar is that the mortar can be cleanly drilled with a tungsten carbide bit for later penetrations that may be needed.

What is claimed is:

1. A method comprising the step of preparing cement such that said cement has a strength substantially independent of the slump thereof by adding iron ore concentrate mini-aggregate to said cement, the mini-aggregate being characterized by high bulk density, a blackish shining appearance, and sharp crystalline corners and flat cleavage planes, said mini-aggregate being formed of particles in major proportion of sizes no larger than would pass through an eight mesh sieve and not small enough to pass through a 150 mesh sieve and being uniformly dispersed throughout matrix, said particles being in major proportion larger than would pass through a 150 mesh sieve.

2. A method as claimed in claim 1 wherein the cement is Portland cement.

3. A method as claimed in claim 1 wherein the cement is a white cement.

4. A method as claimed in claim 1 wherein the iron ore concentrate mini-aggregate is formed with a bulk density of from about 160 to about 190 pounds per cubic foot.

5. A method as claimed in claim 1 wherein the weight ratio of iron ore concentrate mini-aggregate to cement is from about 0.5 parts to about 5 parts per part of cement.

6. A method as claimed in claim 1 comprising combining the cement with reinforcing steel.

7. The method as claimed in claim 1 comprising forming the cement into batches with two respectively different slumps and using one batch to absorb moisture from the other during curing.

* * * * *